UNITED STATES PATENT OFFICE.

ANDREW M. FAIRLIE, OF COPPERHILL, TENNESSEE.

METHOD OF DETERMINING SULFUR DIOXID.

1,205,724.  Specification of Letters Patent.  Patented Nov. 21, 1916.

No Drawing.   Application filed February 23, 1916.  Serial No. 80,037.

*To all whom it may concern:*

Be it known that I, ANDREW M. FAIRLIE, a citizen of the United States, residing at Copperhill, State of Tennessee, have invented certain new and useful Improvements in Methods of Determining Sulfur Dioxid, of which the following is a specification.

The present invention relates to a method of determining the percentage or amount of sulfur dioxid in gases or gas mixtures, and has special reference to the analysis of gas mixtures such as are employed in, or produced in the manufacture of sulfuric acid by those processes involving the interaction of sulfur dioxid, oxygen, oxids of nitrogen and steam, for example the chamber process.

The present invention aims to provide a ready, rapid and reasonably accurate method of determining the amount of sulfur dioxid in gas mixtures containing, in addition to the sulfur dioxid and indifferent gases present, one or more of the oxids of nitrogen.

In my prior copending application Serial No. 10,508, filed February 25, 1915, I have described and claimed a particular improvement in the manufacture of sulfuric acid, in the operation of which method it is necessary to determine, with reasonable accuracy, and rapidity, the percentage of sulfur dioxid in the gases at several points of the apparatus used in the manufacture of sulfuric acid, for example in chambers. In order to determine the amount of sulfur dioxid, it was necessary to devise a new process, since so far as I am aware, most of the existing processes for the determination of sulfur dioxid in gas mixtures, do not give accurate results when treating gases containing oxids of nitrogen. The most rapid and convenient method heretofore known was that known as Reich's method—the method in common use for the determination of sulfur dioxid in burner gases. According to this method, the gas under examination is aspirated through water containing a measured quantity of standard iodin solution, preferably colored blue by starch solution, and contained in an "absorption bottle" provided with a rubber stopper, through which project downwardly two glass tubes, one long and one short; the long one being connected by rubber tubing to the chamber or flue containing the gas to be treated, and the short one to a suitable suction, for example the top of a large bottle containing water, and fitted as an aspirator by having an outlet for the water near the bottom, with rubber tube and regulating cock. Water is allowed to run from the aspirating bottle into a measuring cylinder, thus aspirating gas through the absorption bottle. The sulfur dioxid in the gas reacts with the iodin in the absorption bottle, converting the iodin into hydriodic acid. When nearly all of the iodin has been thus converted, the blue color of the absorption liquid will lose its intensity, and when all of the iodin has been converted into hydriodic acid, the liquid will lose all trace of color and become perfectly clear. When this happens the stopcock regulating the flow of water from the aspirating bottle is instantly closed. The volume of water collected in the measuring cylinder is a measure of the volume of gas aspirated through the iodin solution and so of the percentage of sulfur dioxid in the gas. By reference to published tables the volume of water collected may be readily interpreted into the percentage of sulfur dioxid. This method is sufficiently accurate for burner gas, but when applied to gases containing oxids of nitrogen, it is found that these oxids tend to decompose the hydriodic acid as formed in the absorption bottle, liberating free iodin again. It is obvious that if the known quantity of iodin which is introduced into the absorption bottle for the purpose of making an accurate assay be increased by an unknown quantity liberated by the oxids of nitrogen from the hydriodic acid formed in the early stages of an assay or in a previous assay, the results are vitiated. This liberation of free iodin from the products of a preceding assay, or of the early stages of an assay, is attested by the prompt recurrence of the starch-iodin blue color immediately after that color has been discharged, when operating on gases containing oxids of nitrogen. The inference is that this liberation of free iodin is progressing all the time that the gas is being aspirated; hence that at least more iodin is acted upon by the gas than the measured quantity introduced for the assay; hence that more gas is drawn through the absorption bottle than would have been necessary to decolorize exactly the amount of iodin introduced for the assay; hence that the indicated result, in percentage of sulfur dioxid, is too low. Furthermore, duplicate tests made on the same gas in rapid succession will not, if oxids of nitrogen be present, produce corroborative results, thus indicating that the action of the oxids of nitrogen in liberating free iodin is uncertain and irregular, and cannot be correctly allowed for in calculating results.

I have invented an improvement in Reich's method for sulfur dioxid determinations, by the adoption of which the recurrence of the blue color or the interference caused by the presence of oxids of nitrogen may be either prevented altogether, or may be so delayed as not to interfere with the accuracy of a test, to any perceptible degree.

My improvement consists in the addition to the absorption bottle or absorption liquid, of a Reich's or other sulfur dioxid determination apparatus, of a salt of some base (either in solution or otherwise) such as the carbonate, sulfate, acetate, or other salt of potassium, sodium, zinc, or other base (but preferably the acetate of sodium) together with a sufficient amount of acid (for example, sulfuric, acetic, or hydrochloric acid or an acid anhydrid, said acid being without oxidizing or reducing action on hydriodic acid or iodin) to render the solution acid.

Without limiting myself to the exact materials or amounts given, I give the following example of the solution to be used in the absorption bottle: N/10 iodin solution, 1 c. c.; water, 100 c. c.; starch solution, 5-6 drops, and sodium acetate mixture, 10 c. c. This "sodium acetate mixture" may be prepared by adding one volume of acetic acid (say 95%) to five volumes of saturated sodium acetate solution.

I do not limit myself to the particular chemicals just mentioned, as the use of a salt of any base in combination with an acid or acid anhydrid (having no oxidizing or reducing action) in the iodin test for sulfur dioxid, would be but carrying out the principle of my invention.

By means of my improvement in the Reich test for sulfur dioxid it is possible at any time to make sulfur dioxid determinations in duplicate on gas mixtures containing oxids of nitrogen which will check each other within one one-hundredth (.01) of one per cent.—a degree of accuracy which is not attained by any other method for the analysis of such gas mixtures, so far as I am aware. Since my improved method requires no longer time for its execution than the ordinary Reich test, its value for the purposes above described is obvious.

What I claim is:—

1. The herein described method of determining sulfur dioxid in gases containing sulfur dioxid and oxygen-nitrogen compounds which comprises passing said gases, into contact with a solution containing a known amount of free iodin, together with an acid and a salt, said acid and salt being inert to iodin, until the free iodin has entirely combined, and measuring the amount of said gases necessary.

2. The herein described method of determining the amount of sulfur dioxid in a gas mixture containing this and oxids of nitrogen, which comprises passing said gases into contact with an acid solution containing sodium acetate and an acid, said acid being inert to iodin, inert to sulfur dioxid or sulfurous acid, and inert to oxids of nitrogen, said solution containing a known amount of free iodin, until said free iodin has entirely combined, and measuring the amount of said gas used.

3. A method of determining sulfur dioxid in gas mixtures which comprises passing the gases in contact with a solution containing a known volume of standard iodin solution, together with water, starch solution, sodium acetate solution and acetic acid, until the blue color just disappears and measuring the amount of gases so introduced to produce the elimination of the color.

4. A method of determining sulfur dioxid in gas mixtures which comprises passing the gas mixture in contact with a liquid comprising N/10 iodin solution, 1 c. c.; water, about 100 c. c.; starch solution, about 5-6 drops; saturated sodium acetate solution, 5 c. c.; strong acetic acid, about 5 c. c., until the blue coloration disappears, and measuring the volume of gases necessary to produce the elimination of the blue color.

In testimony whereof I affix my signature.

ANDREW M. FAIRLIE.